United States Patent
Shi et al.

(10) Patent No.: US 10,460,753 B1
(45) Date of Patent: Oct. 29, 2019

(54) HELIUM DRIVE PIVOT DESIGN TO REDUCE COVER SCREW TENSION INDUCED TORQUE AND STIFFNESS CHANGES

(71) Applicant: Seagate Technology LLC, Cupertino, CA (US)

(72) Inventors: Zheng Shi, Shakopee, MN (US); Glenn A. Benson, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/975,939

(22) Filed: May 10, 2018

(51) Int. Cl.
  *G11B 5/127* (2006.01)
  *G11B 5/48* (2006.01)

(52) U.S. Cl.
  CPC .................................. *G11B 5/4813* (2013.01)

(58) Field of Classification Search
  CPC ........ G11B 5/127; G11B 5/1278; G11B 5/315
  USPC .................. 360/123.01–123.06, 123.1–123.6
  See application file for complete search history.

(56) References Cited

U.S. PATENT DOCUMENTS

| | | | |
|---|---|---|---|
| 6,655,847 B2 | 12/2003 | Obara et al. | |
| 8,547,664 B1 * | 10/2013 | Foisy | G11B 5/4813 360/265.2 |
| 8,553,366 B1 * | 10/2013 | Hanke | G11B 33/1473 360/264.2 |
| 9,196,292 B1 * | 11/2015 | Nguyen | G11B 17/0284 |
| 2013/0321950 A1 * | 12/2013 | Fu | G11B 25/043 360/99.08 |
| 2016/0086624 A1 * | 3/2016 | Pan | G11B 5/4846 360/245.3 |
| 2016/0131190 A1 | 5/2016 | Tsuchiya et al. | |

* cited by examiner

*Primary Examiner* — Allen T Cao
(74) *Attorney, Agent, or Firm* — Kagan Binder, PLLC

(57) ABSTRACT

A disk drive including a disk drive base having a lower portion and a base post extending upwardly from the lower portion, a rotatable spindle attached to the disk drive base, and a head actuator pivotally attached to the disk drive base. The head actuator includes an actuator body having a bore therein, and an actuator pivot bearing disposed at least partially within the bore, the actuator pivot bearing having a cover attachment member extending at least partially into a distal end of the base post. An upper portion of the pivot shaft includes an annular groove and a lower portion of the pivot shaft includes an annular recess.

16 Claims, 6 Drawing Sheets

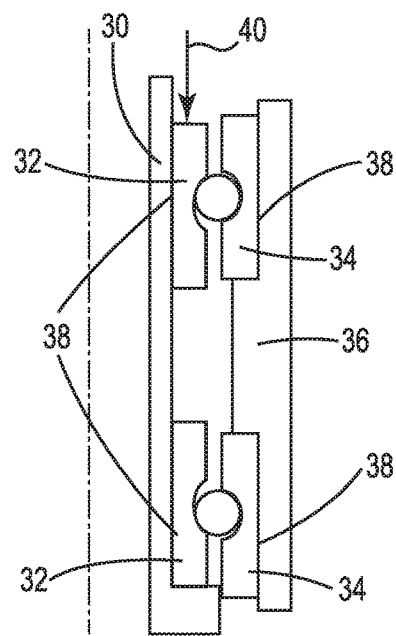
Fig. 2
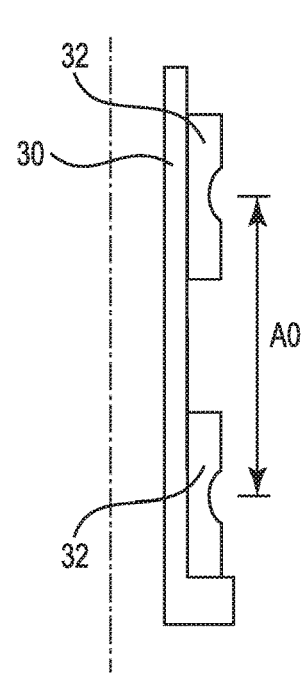 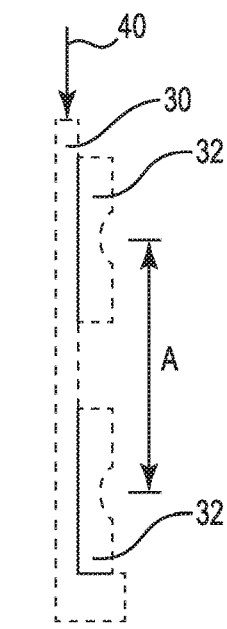
Fig. 3a    Fig. 3b

HELIUM DRIVE PIVOT DESIGN TO REDUCE COVER SCREW TENSION INDUCED TORQUE AND STIFFNESS CHANGES

BACKGROUND

Computers generally utilize disk drives for data storage and retrieval, such as magnetic recording hard disk drives that utilize a head assembly for reading and/or writing data on a rotatable magnetic disk. In such systems, the head assembly is typically attached to an actuator arm by a head suspension assembly (HSA) comprising a head suspension and an aerodynamically designed slider onto which a read/write head is provided. When the head is positioned over a spinning disk during usage, the head position is at least partially controlled by balancing a lift force that is caused by an air bearing generated by the spinning disk and acting upon the slider, and an opposite bias force of the head suspension. In operation, the slider and head are designed to "fly" over the spinning disk at high speeds and at precisely determined distances from the disk surface.

Head stack assemblies (HSAs) typically include a plurality of head gimbal assemblies (HGAs), a rotary actuator, and a flex cable. The mounting plate of each suspension assembly is attached to an arm of the rotary actuator (e.g. by swaging), and each of the laminated flexures is electrically connected to the HSA's flex cable (e.g. by solder reflow bonding or ultrasonic bonding). The angular position of the HSA, and therefore the position of the read heads relative to data tracks on the disks, is actively controlled by the rotary actuator which is typically driven by a voice coil motor that allows the read/write head to seek and follow desired data tracks on a spinning disk.

The rotary actuator of the HSA is pivotally attached to a base of the disk drive, such as by an actuator pivot bearing that allows the HSA to pivot. The positioning of other disk drive components limits the pivoting to a limited angular range. The actuator pivot bearing is typically mounted to the base of the disk drive by a first screw that extends upwardly through the bottom of the base and a second screw that extends downwardly through the top cover of the disk drive. Such a configuration can be useful for typical air drives, but the two screw design can provide for areas through with the helium can leak. In addition, when certain configurations of this type are used for helium drives, the torque and stiffness of the pivots can be sensitive to cover screw tension. Large changes in pivot torque and stiffness can affect actuator performance and impact actuator controls. There is a desire in the art for a helium disk drive in which the torque and stiffness sensitivities are reduced.

SUMMARY

Aspects of the invention described herein are directed to a disk drive pivot design that is particularly applicable to helium drives. In particular, the pivot design is useful to reduce cover screw tension-induced torque and stiffness changes with pivot shaft walls that may be thinner than conventional shaft walls.

In an embodiment, a disk drive is provided that includes a disk drive base comprising a lower portion and a base post extending upwardly from the lower portion, a rotatable spindle attached to the disk drive base, and a head actuator pivotally attached to the disk drive base. The head actuator includes an actuator body having a bore therein, and an actuator pivot bearing disposed at least partially within the bore. The actuator pivot bearing includes a cover attachment member extending at least partially into a distal end of the base post. The cover attachment member may include a threaded outer surface to mate with a threaded inner opening of the base post, such as a screw.

The disk drive may include a head stack assembly that comprises the head actuator and a plurality of head gimbal assemblies. The disk drive may include a top cover member, wherein the cover attachment member extends through the top cover member. The actuator pivot bearing may include a pivot shaft that is at least partially positioned adjacent to the base post, and the pivot shaft may extend from a proximal end at the disk drive base to a distal end that is adjacent to a top cover member. The pivot shaft can be fixed to the disk drive base and may include a pivot sleeve that is rotatable relative to the pivot shaft.

The pivot shaft may include a main portion adjacent to the base post and an upper portion that extends upwardly from and is offset from the main portion, and the upper portion of the pivot shaft may include an annular groove. The pivot shaft may further include a lower portion that extends downwardly from the main portion and that includes an annular recess. The main portion of the pivot shaft may include an inner diameter that is larger than an inner diameter of the upper portion of the pivot shaft.

The actuator pivot bearing further may include at least one set of ball bearings, such as an upper set of ball bearings and a lower set of ball bearings. The actuator pivot bearing may include bearings having an inner race with a radius, wherein the inner races are rotatable to increase a distance between race groove centers.

Disk drive embodiments described herein are configured to lower the sensitivities of pivot torque and stiffness to cover screw tension change to improve actuator performance and reduce difficulties of actuator control. These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein:

FIG. 2 is a schematic view of a pivot bearing with an applied preload at its bearings;

FIGS. 3a and 3b are schematic views of a shaft of a pivot bearing both with and without an applied screw force;

DETAILED DESCRIPTION

Figure 1:
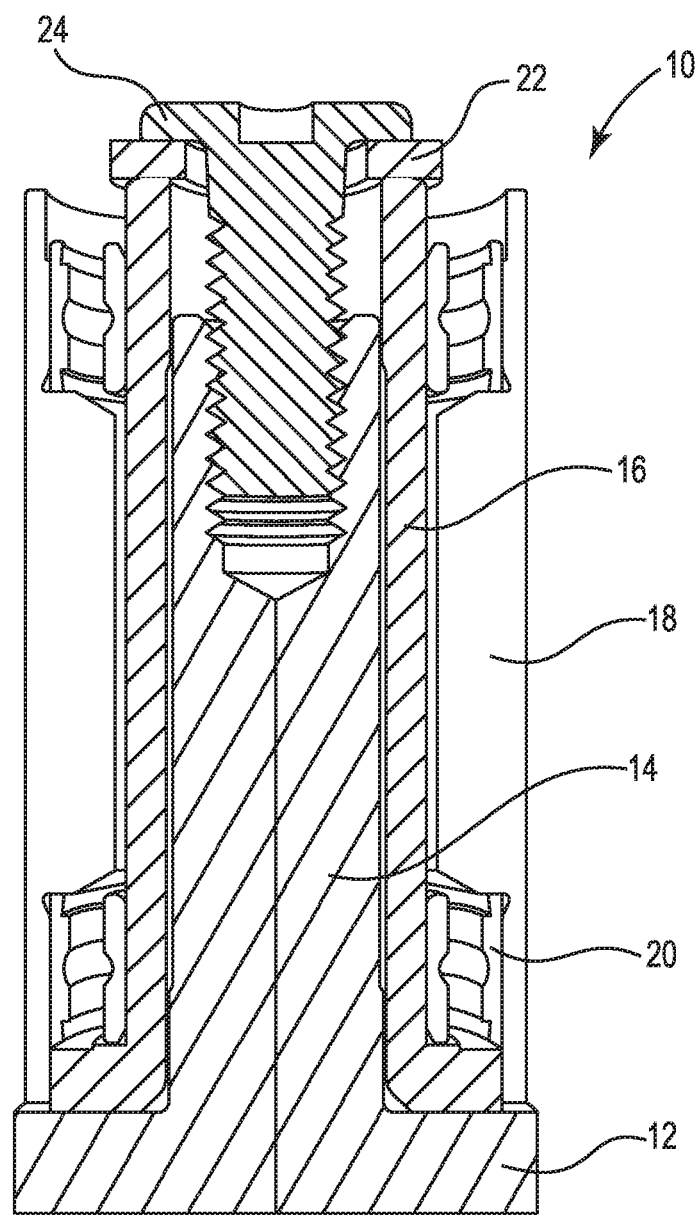
FIG. 1 is a cross-sectional view of an embodiment of an actuator pivot bearing of the type that can be used for helium disk drives.

The methods and features described herein are applicable to hard disk drive (HDD) systems of the type that are generally available in the art, and may be more particularly applicable to HDD systems known as helium HDD systems in that helium is contained within the inner cavity of the HDD. Helium drives have a number of advantages over traditional drives (e.g., air drives) for high capacity and less power consumption. However, certain challenges are present in the use of sealed helium drives. For example, to seal a helium drive, some mechanical parts (e.g., the drive base, cover, and actuator pivot) have to be designed differently than for an air drive wherein the shaft of the pivot bearing is typically fixed to the drive base through a screw. Although the HDD features and configurations described herein can provide advantages for helium HDD systems that include requirements for retaining helium, the HDD features described herein can also be applicable to non-helium HDD systems.

The HDD systems described herein generally include at least one magnetic storage disk configured to rotate about an axis, an actuation motor (e.g., a voice coil motor), an actuator arm, a suspension assembly that includes a load beam, and a slider carrying a transducing or read/write head. The slider is supported by suspension assembly, which in turn is supported by an actuator arm. Together, the actuator arm, suspension assembly and slider form a head stack assembly (HSA). The actuation motor is configured to pivot the actuator arm about an axis, in order to sweep the suspension and the slider in an arc across a surface of one of the rotating disks with slider "sliding" or "flying" across disk on a cushion of air, often referred to as an air bearing. The read/write head carried by the slider can be positioned relative to selected concentric data tracks of one of the disks by a piezoelectric microactuator, for example. A stack of co-rotating disks can be provided with additional actuator arms, suspension assemblies, and sliders that carry read/write heads for reading and writing at top and bottom surfaces of each disk in the stack. The HSA is pivotally attached to a base of the disk drive, such as by an actuator pivot bearing that allows the HSA to pivot.

In the area where the actuator pivot bearing will be located, the HSA can include an actuator body with a bore. An actuator pivot bearing, as will be described below, will be positioned at least partially within the bore. The actuator pivot bearing may include an inner shaft and a rotatable outer portion. In particular, the actuator pivot bearing may include a rotatable outer sleeve that is press-fit into the bore of the actuator body, and/or held in place within the bore of the actuator body by a tolerance ring, for example. Alternatively, the actuator pivot bearing may be held within the bore of the actuator body by a connector. In another embodiment, the actuator pivot bearing may instead have rotatable outer bearing races that are directly bonded to an inner surface of the bore in the actuator body, such as with an adhesive.

Torque and stiffness of current helium drive actuator pivot bearings are relatively sensitive to cover screw tension change due to axial and radial deformations of the pivot shaft induced by screw force. The shaft deformations cause the spacing between inner bearing races, which are fixed to the pivot shaft to decrease and the radii of inner races, to increase. The decrease in race spacing and the increase in race radii in the ball-race contact areas (outer regions) result in higher internal bearing load which causes higher pivot torque and stiffness. In embodiments described herein, under a cover screw tension, the radii of inner races decrease in the outer regions and increase in the inner regions. These race deformations facilitate race rotations which compensate part of the race spacing change caused by screw tension. The race radius decreases and spacing compensation make pivot torque and stiffness less sensitive to cover screw tension change.

Referring now to the Figures, and particularly to FIG. 1, an actuator pivot bearing 10 of a helium drive is illustrated. Actuator pivot bearing 10 includes a drive base 12 from which a base post 14 upwardly extends, a pivot shaft 16 mounted to the base post 14, and a pivot sleeve 18 positioned for rotation about the pivot shaft 16. This rotation of the pivot sleeve 18 relative to the pivot shaft 16 is facilitated by bearings 20. The actuator pivot bearing 10 is secured to a drive cover 22 by a cover screw 24. As shown, the outer surface of the extending portion of cover screw 24 is threaded to mate with an inner threaded surface of the base post 14.

By providing a design that does not include both bottom and top screws for the pivot drive, the configuration of the drive base 12 eliminates the leaking of helium or other substances that can occur in configurations that include a bottom screw hole. This configuration also can include a thinner wall for the pivot shaft than conventional air drive pivots. However, the use of such a thinner wall for helium pivot shafts can cause shaft deformation when under cover screw tension such that it can significantly change the pivot torque and stiffness.

A drive pivot has designed values of torque and stiffness. The torque and stiffness are established by bearing preload. In a pivot assembly process, a preload is applied to the inner race and fixed by curing adhesive applied between surfaces of the inner race and shaft, as is illustrated in FIG. 2. A pivot shaft 30 is illustrated in FIG. 2 to which bearing inner races 32 are attached, such as with an adhesive 38. Any appropriate adhesive can be chosen, depending on the materials of the corresponding surfaces to which it will be applied. The bearing outer races 34 are fixed to a pivot sleeve 36, such as with the same or a different adhesive as that which attaches the inner races. In a helium pivot, under cover screw tension, such as is provided by a preload force applied in a direction 40, the pivot shaft 30 becomes shorter, or the inner race spacing is reduced, which results in higher internal load, or is equivalent to the imposing of a higher preload.

The inner race spacing can be measured as the distance between the inner race groove curvature centers, as is illustrated in FIGS. 3a and 3b. In particular, the distance between the groove curvature centers of the inner races 32 of FIG. 3a, in which the pivot shaft 30 is not subjected to a screw force, is a distance AO, while the distance between the groove curvature centers of the inner races 32 of FIG. 3b, in which the pivot shaft 30 is subjected to a screw force 40, is a distance A. As is illustrated, the distance AO of FIG. 3a is greater than the distance A of FIG. 3b. The inner race radius increase reduces the original bearing clearance and may result in higher internal load, which is also equivalent to a higher preload imposed. Both factors can contribute to higher pivot torque and stiffness.

Figure 4:
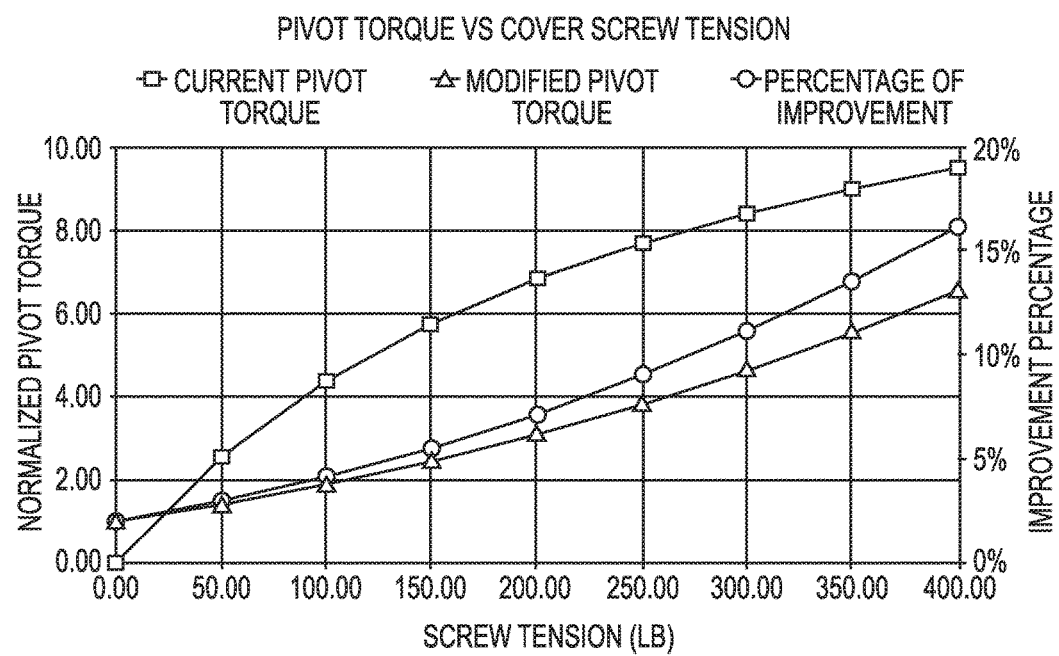
FIG. 4 is a graph of the pivot torque versus cover screw tension for two pivot configurations with shafts having different cross-sectional areas.

Large changes in drive pivot torque and stiffness can impact actuator performance and impose difficulties on actuator controls. It can therefore be desirable to reduce the sensitivities of torque and stiffness changes to the screw tension. In an embodiment, relative cover screw size and post diameter is reduced to increase the shaft wall thickness. The graph of FIG. 4 illustrates improvements achieved after increasing the shaft cross section area by approximately 20%. As shown in the graph, the improvement approximately 15% using a screw tension of 250 pounds, for one example. Although such an approach may be limited by the pivot structure strength and stiffness, it may provide a desired improvement in certain circumstances.

Figure 5:
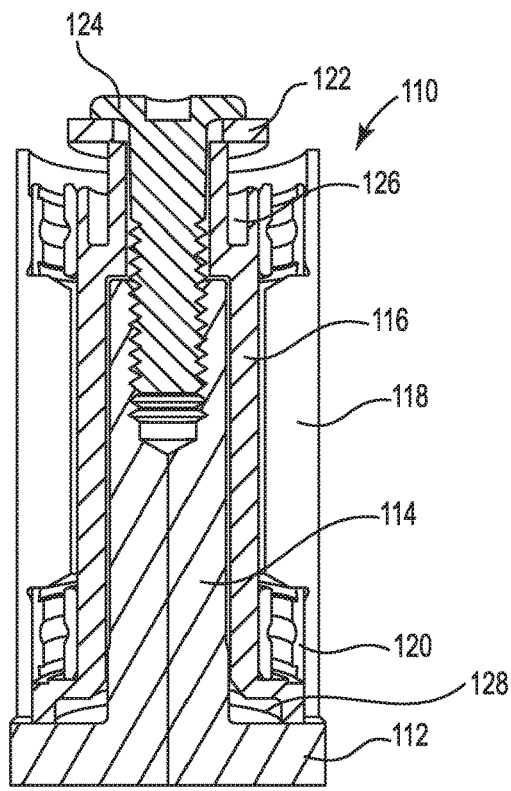
FIG. 5 is a cross-sectional view of another embodiment of an actuator pivot bearing of the type that can be used for helium disk drives.

FIG. 5 illustrates an exemplary embodiment of an actuator pivot bearing 110 that provides a shaft design that can further reduce the sensitivity of pivot torque and stiffness versus cover screw tension. In particular, an actuator pivot bearing 110 of a helium drive is illustrated. Pivot bearing 110 includes a drive base 112 from which a base post 114 upwardly extends, a pivot shaft 116 mounted to the base post 114, and a pivot sleeve 118 positioned for rotation about the pivot shaft 116. This rotation of the pivot sleeve 118 relative to the pivot shaft 116 is facilitated by bearings 120. The actuator pivot bearing 110 is secured to a drive cover 122 by a cover screw 124. As shown, the outer surface of the extending portion of cover screw 124 is threaded to mate with an inner threaded surface of the base post 114.

Figure 6:
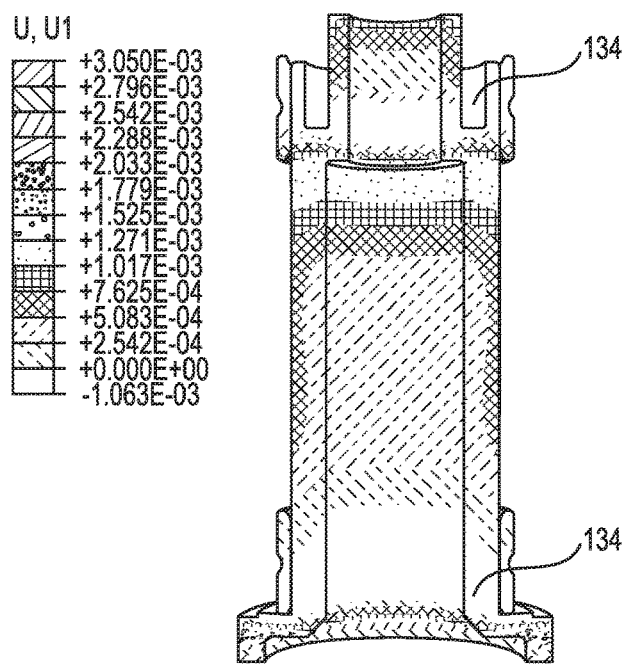
FIG. 6 is a contour plot of the cross-sectional area of the actuator pivot bearing of FIG. 5 when under screw tension.

In this embodiment, an annular groove 126 is provided at the top area of the pivot shaft 116, and a recess 128 is provided in the bottom area of the pivot shaft 116 in between the pivot shaft 116 and the top surface of the drive base 112. Under tension of the cover screw 124, these features induce the reductions of radii in the part of inner race groove areas (ball-race contact areas), which are shown as regions 134 (negative deformation) in the contour plot of FIG. 6. The relative size, shape, and volume of both the groove 126 and the recess 128 can vary at least somewhat from the illustrated embodiment, and can be designed and/or selected to provide desired properties when the pivot bearing is under tension from the cover screw 124. It is contemplated that the groove 126 is annular and extends around the entire perimeter of the pivot shaft 116, or that the groove 126 only extends around portions of the perimeter of the pivot shaft 116.

Figure 7:
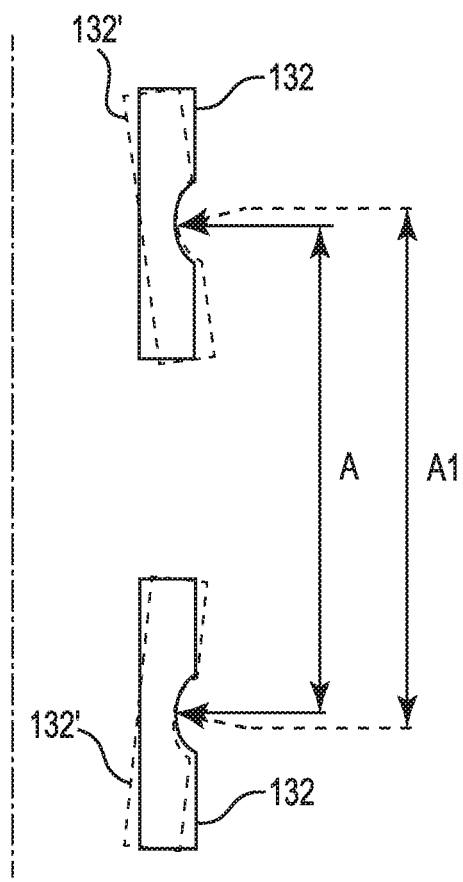
FIG. 7 is a schematic view of bearings of an actuator pivot bearing embodiment with the inner races rotated.

Decreases in the inner race regions can increase original bearing clearance, as is illustrated with the inner races 132 (original) and 132' (rotated) in FIG. 7. The deformations facilitate inner race rotations to increase the distance between the race groove centers from the original positions (illustrated by the distance A) and the rotated positions (illustrated by the distance A1). The deformations therefore compensate for part of the inner race spacing changes due to the shaft axial deformation.

Figure 8:
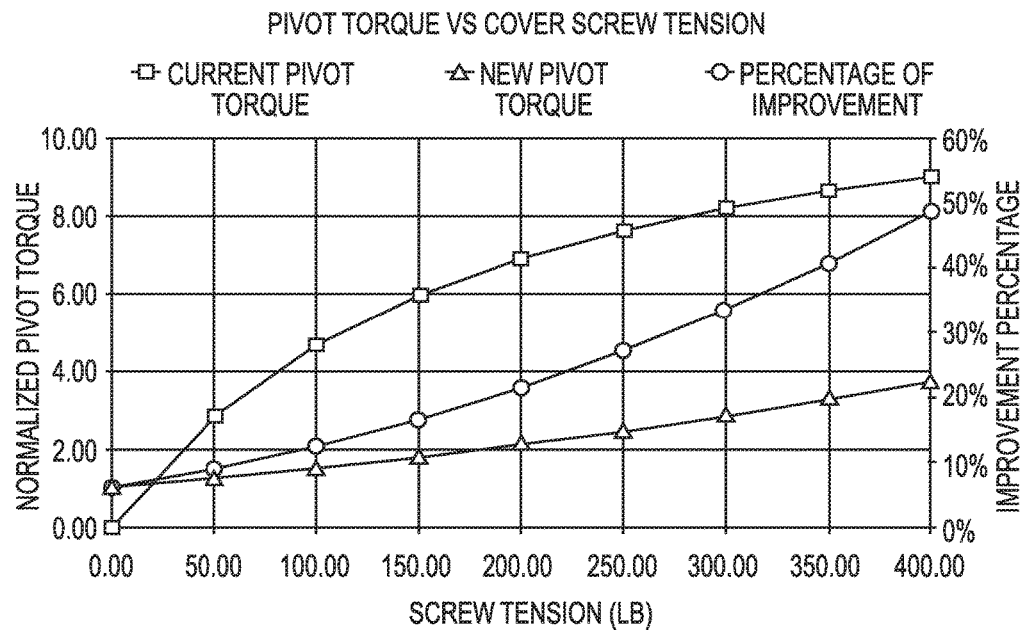
FIG. 8 is a graph of the pivot torque versus cover screw tension for two pivot configurations.
Figure 9:
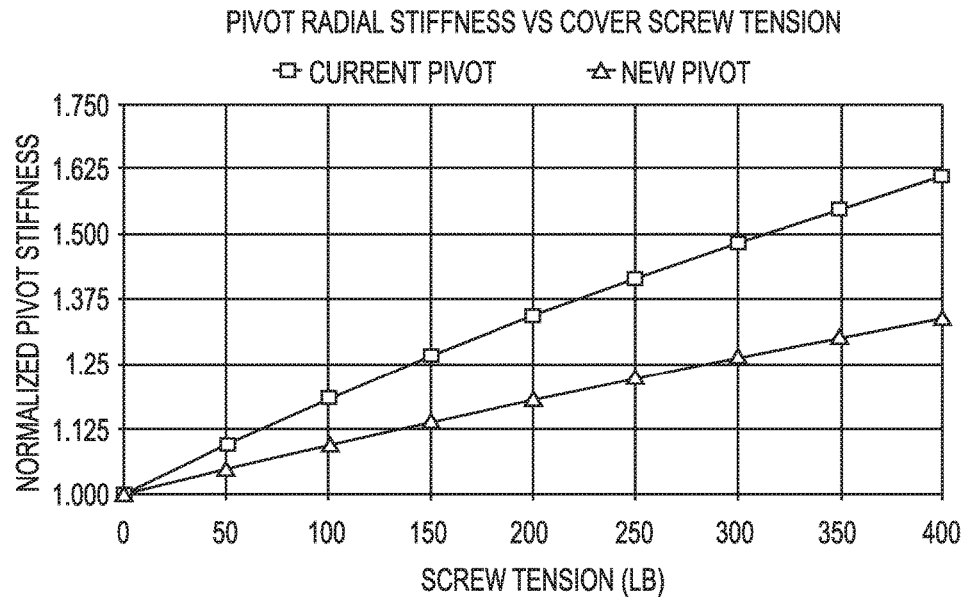
FIG. 9 is a graph showing the pivot radial stiffness versus cover screw tension for two different pivot bearing designs.

FIGS. 8 and 9 illustrate pivot torque versus cover screw tension and pivot radial stiffness versus cover screw tension, respectively for the pivot bearing embodiment of FIG. 5, which includes an annular groove and recess in the pivot shaft. In particular, the graph of FIG. 8 illustrates that for the exemplary screw tension of 250 pounds, the improvement is approximately 46%, and similar improvements for other screw tensions.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A disk drive comprising:
a disk drive base comprising a lower portion and a base post extending upwardly from the lower portion;
a rotatable spindle attached to the disk drive base; and
a head actuator pivotally attached to the disk drive base, the head actuator comprising:
an actuator body having a bore therein; and
an actuator pivot bearing disposed at least partially within the bore, the actuator pivot bearing comprising a cover attachment member at least partially engaged within a distal end portion of the base post.

2. The disk drive of claim 1, wherein the cover attachment member comprises a threaded outer surface to mate with a threaded inner opening of the base post.

3. The disk drive of claim 1, wherein the cover attachment member comprises a screw.

4. The disk drive of claim 1, further comprising a head stack assembly that comprises the head actuator and a plurality of head gimbal assemblies.

5. The disk drive of claim 1, further comprising a top cover member, wherein the cover attachment member extends through the top cover member.

6. The disk drive of claim 1, wherein the actuator pivot bearing further comprises at least one set of ball bearings.

7. The disk drive of claim 6, wherein the at least one set of ball bearings comprises an upper set of ball bearings and a lower set of ball bearings.

8. A disk drive comprising:
a disk drive base comprising a lower portion and a base post extending upwardly from the lower portion;
a rotatable spindle attached to the disk drive base; and
a head actuator pivotally attached to the disk drive base, the head actuator comprising:
an actuator body having a bore therein; and
an actuator pivot bearing disposed at least partially within the bore, the actuator pivot bearing comprising a cover attachment member extending at least partially into a distal end of the base post, wherein the actuator pivot bearing comprises a pivot shaft that is at least partially positioned adjacent to the base post.

9. The disk drive of claim 8, wherein the pivot shaft extends from a proximal end at the disk drive base to a distal end that is adjacent to a top cover member.

10. The disk drive of claim 8, wherein the pivot shaft is fixed to the disk drive base.

11. The disk drive of claim 10, further comprising a pivot sleeve that is rotatable relative to the pivot shaft.

12. The disk drive of claim 8, wherein the pivot shaft comprises a main portion adjacent to the base post and an upper portion that extends upwardly from and is offset from the main portion.

13. The disk drive of claim 12, wherein the upper portion of the pivot shaft comprises an annular groove.

14. The disk drive of claim 13, wherein the pivot shaft further comprises a lower portion that extends downwardly from the main portion, and wherein the lower portion comprises an annular recess.

15. The disk drive of claim 12, wherein the main portion of the pivot shaft comprises an inner diameter that is larger than an inner diameter of the upper portion of the pivot shaft.

16. A disk drive comprising:
a disk drive base comprising a lower portion and a base post extending upwardly from the lower portion;
a rotatable spindle attached to the disk drive base; and
a head actuator pivotally attached to the disk drive base, the head actuator comprising:
an actuator body having a bore therein; and
an actuator pivot bearing disposed at least partially within the bore, the actuator pivot bearing comprising a cover attachment member extending at least partially into a distal end of the base post, wherein the actuator pivot bearing comprises bearings having an inner race with a radius, and wherein the inner races are rotatable to increase a distance between race groove centers.

\* \* \* \* \*